United States Patent [19]
Lee et al.

[11] Patent Number: 5,939,480
[45] Date of Patent: Aug. 17, 1999

[54] THERMOSETTING RESIN COMPOSITIONS COMPRISING POLYVINYLCHLORIDE AND PHTHALIC ACID ESTER

[75] Inventors: James S. W. Lee, Long Island, N.Y.; Kwong-Wai Chow, Kowloon, The Hong Kong Special Administrative Region of the People's Republic of China

[73] Assignee: C.J. Associates, Ltd., Hunghom, The Hong Kong Special Administrative Region of the People's Republic of China

[21] Appl. No.: 08/969,973

[22] Filed: Nov. 13, 1997

[51] Int. Cl.$^6$ .......................................... C08J 5/12
[52] U.S. Cl. ........................... 524/296; 524/107; 524/436
[58] Field of Search ..................................... 524/296, 107, 524/436

[56] References Cited

U.S. PATENT DOCUMENTS

| | | |
|---|---|---|
| 1,554,032 | 9/1925 | Reid . |
| 1,984,284 | 12/1934 | Reid . |
| 2,130,014 | 9/1938 | Jaeger et al. . |
| 2,644,009 | 6/1953 | Cash et al. . |
| 5,179,138 | 1/1993 | Uemura et al. .......................... 523/330 |
| 5,310,805 | 5/1994 | Igarashi ................................... 525/239 |
| 5,432,222 | 7/1995 | Igarashi ................................... 524/399 |

OTHER PUBLICATIONS

L. Raether and H. Gomrath, J.Org. Chem. 24, 1997–2000 (1959).
Solutia brochure, Coating Performance Materials—Global Solutions, "Santicizer® Plasticizers," p. 1, www.coatings–solutia.com/docs/Santcizr.htm.
Solutia brochure, Coatings Performance Materials—Global Solutions, Santicizer® Plasticizers, pp. 1–2, www.coatings–solutia.com/docs/Tech Pubs/SantBull.htm.
Solutia brochure, Coatings Performance Materials—Global Solutions, Santicizer® 141 Data Sheet Pub. No. 1540, "FDA Regulated, flame–retardant, low temperature plasticizer" pp. 1–8, www.coatings–solutia.com/docs/PDS/S–141.htm.
Solutia brochure, Coatings Performance Materials—Global Solutions, Santicizer® 160 Data Sheet Pub. No. 2311534B, "High Soluating, stain–resisting plasticizer" pp. 1–8, www-.coatings–solutia.com/docs/PDS/S–160.htm.
Solutia brochure, Coatings Performance Materials—Global Solutions, Santicizer® 261 Data Sheet Pub. No. 1535, "Low Volatility, High Soluating Plasticizer" pp. 1–5, www.coatings–solutia.com/docs/PDS–261.htm.
Solutia brochure, Coatings Performance Materials—Global Solutions, Santicizer® 278 Data Sheet Pub. No. 2311536A, "Monomeric Plasticizer Offering Permanence That Approximates Polymerics," pp. 1–7, www.coatings–solutia.com/docs/PDS–278.htm.
Solutia brochure, Coatings Performance Materials—Global Solutions, Santicizer® 2148 Data Sheet Pub. No. 8107, "Low–Smoke, Flame–Retardant Plasticizer with Very Low Volatility and Outstanding Low Temperature Performance" pp. 1–5, www.coatings–solutia.com/doc/PDS/S–2148.htm.

*Primary Examiner*—Robert Dawson
*Assistant Examiner*—D. Aylward
*Attorney, Agent, or Firm*—Laff, Whitesel & Saret, Ltd.

[57] ABSTRACT

Thermosetting polymer compositions for forming molded products having a soft, resiliently deformable skin are provided. The polymer resin compositions include polyvinylchloride, phthalic acid ester, a heat stabilizing agent and a heat resistance agent and have physical properties that resemble latex-containing compositions.

18 Claims, No Drawings

THERMOSETTING RESIN COMPOSITIONS COMPRISING POLYVINYLCHLORIDE AND PHTHALIC ACID ESTER

FIELD OF THE INVENTION

The present invention generally relates to thermosetting resins for use in slush molding or rotational casting and more particularly to latex-free, thermosetting resins comprising polyvinylchloride and a phthalic acid ester, which provide resiliently deformable soft skinned molded items.

BACKGROUND OF THE INVENTION

Rotational cast molding and slush molding are well-known processes for making molded plastic items. In rotational cast molding, the mold is filled with a predetermined amount of thermosetting plastic material and rotated while maintaining the mold at elevated temperatures to form a substantially continuous layer of skin on the inside walls of the mold. In slush molding processes, the mold is commonly filled completely, heated to permit a skin layer to form on the inside of the mold, after which the un-set liquid resin is poured off. In either method, after the skin-forming steps are completed, the mold is cooled and the molded piece removed.

It is well known that latex-containing resins can be used to mold soft-skinned products that are resiliently deformable. However, resins containing latex are unsatisfactory for many applications that require a thin-skinned product with a smooth or finely textured surface because latex containing resins are relatively viscous and are not known to provide uniformly thin skin layers having a smooth and finely textured surface finish. The disadvantages of latex-containing resins are magnified in applications where relatively large molded pieces of 12 inches to 36 inches in length or more having a relatively thin skin layer are desired. It would therefore be desirable to provide thermosetting resins which are capable of being employed in rotational cast molding or slush molding to provide smooth, thin skinned, resiliently deformable products. It would also be desirable to provide thermosetting resins which can be used to mold relatively large, smooth, thin skinned items.

SUMMARY OF THE INVENTION

The inventors have discovered polymer compositions comprising from about 35 to 45 wt % polyvinyl chloride and from about 50 to 60 wt % of an ester of phthalic acid, wherein the ester moieties are the same or different and comprise a linear, branched or cyclic alkyl group having 4 to 12 carbon atoms or a benzyl group. The resin compositions of the present invention further comprise from about 1 to 3 wt % of a heat stabilizer such as a liquid calcium and zinc organic complex and from about 1 to 3 wt % of an epoxidized vegetable oil. The compositions of the present invention optionally comprise up to 2 wt % or more, preferably about 1 wt % pigment.

The compositions of the present invention provide thermosetting resins which, when employed in conventional slush molding or rotational casting processes, produce surprisingly finely textured, resiliently deformable molded products having tactile properties that resemble those of products made from latex-containing resins. The compositions and methods of the present invention can be used to produce a variety of resiliently deformable items, including but not limited to, toys and molded items for women's apparel, such as shoulder pads, brassiere cups and the like.

DETAILED DESCRIPTION OF THE INVENTION

The resin compositions of the present invention comprise from about 35 to 45 wt %, more preferably about 38 to 42 wt % and most preferably about 40 wt % polyvinyl chloride; from about 50 to 60 wt %, more preferably about 53 to 57 wt %, and most preferably about 55 wt % of an ester of phthalic acid, wherein the ester moieties comprise linear, branched or cyclic alkyl groups having from 4 to 12 carbon atoms or a benzyl group; from about 1 to 3 wt %, preferably 2 wt % of a heat stabilizer composition; and from about 1 to 3 wt %, preferably about 2 wt % of a heat resistance agent. The compositions of the present invention optionally comprise up to 2 wt % or more, preferably about 1 wt % pigment.

The polyvinylchloride ingredient of the compositions can be of any type of polyvinylchloride known for use in molding plastic products. It is presently preferred to use a powdered polyvinylchloride. As will be appreciated by those skilled in the art, K-values are typically used to define the average molecular weight of the polyvinylchloride. The polyvinylchloride ingredient used in the polymer compositions will have a K-value in the range of from 45 to 100, preferably 55 to 80 and most preferably 65 to 70.

The phthalic acid esters of the compositions of the present invention are well known and may be commercially obtained. Several dialkylphthalates and benzylalkylphthalates are commercially available under the trademark "Santicizer" from Solutia, a division of Monsanto. The esters of phthalic acid may be readily prepared as known in the art. Synthesis of various phthalate ester is described in U.S. Pat. Nos.: 1,554,032; 1,984,284; 2,130,014; 2,644,009; 4,229,586; and in L. Raether and H. Gamrath, J. Org. Chem. 24, 1997–2000 (1959). A variety of syntheses for other phthalic acid esters may be found in *The Beilstein Handbook of Organic Chemistry,* 4th Edition (Springer 1988). Among the presently preferred dialkylphthalate compounds which may be used to prepare a resin composition of the invention are diheptylphthalate, diisoheptylphthalate, di-2-ethylhexylphthalate, dioctylphthalate, diisooctylphthalate, dinonylphthalate, diisononylphthalate, didecylphthalate, diisodecylphthalate, and diundecylphthalate. Diisononylphthalate is most preferred and is commercially available under the trademark "Jayflex" from Exxon Chemical Company.

The compounds of the invention further comprise a high temperature resistance agent chosen from those known in the art for molding plastic items using slush molding or rotational casting techniques. Presently preferred high temperature resistance agents include epoxidized soybean oil and other suitable epoxidized vegetable oils, such as corn oil, peanut oil, cannola oil or the like.

The compositions of the invention also include a heat stabilizer as known in the art for molding plastic items using slush molding or rotational casting techniques. A presently preferred heat stabilizer is a liquid calcium and zinc organic complex, known in the art as "Brainstab CZ-101," which is commercially available from Brain Resources Enterprises Company Limited, Kowloon, Hong Kong.

The compounds of the present invention optionally may also contain a pigment as desired to provide a base color to the molded plastic article. A suitable pigment may be chosen from among the pigments known in the art for use with plastic resins. A pigment may be included in the compositions of the invention at a level up to 2% or more by weight, and preferably about 1 wt %. Molded products made using the polymer compositions of the invention may be further finished by painting as known in the art.

The polymer compositions optionally may contain about 0.5%–1% plasticizer such as Kodaflex TXIB (trimethyl pentamediol diisobutyrate), available from Eastman Chemical Co., (CAS No. 68-46-50-0), as a hardener to adjust the rigidness of the skin, if needed.

A presently preferred composition of the invention comprises 40 wt % polyvinyl chloride, 55 wt % diisononylphthalate; 2 wt % epoxidized soybean oil; 2 wt % of a liquid calcium and zinc organic complex; and 1 wt % pigment.

To prepare the resin compositions of the present invention, powdered polyvinylchloride and the selected phthalic acid ester are combined with continuous mixing to form a uniform mixture. Then, the heat resistance agent, such as epoxidized vegetable oil, and the heat stabilizer, such as a liquid calcium and zinc organic complex, and, preferably, the pigment are added. The ingredients are thoroughly mixed for up to several hours and then degassed for about 5 to 30 minutes to remove air introduced during the mixing process. The degassed resin composition is then injected into a mold as is known in the art. The compositions of the present invention are thermosetting during the molding procedure at a temperature between about 150° C. to 250° C., preferably between about 175° C. and 225° C. and most preferably at about 200° C. The heating step is carried out for an amount of time of from less than one minute to about 5 minutes or more. It may be desirable, especially where a slush molding technique is used, to heat the mold for a first amount of time to form a "raw" skin layer, then decant the residual resin and heat the mold for a second amount of time to "mature" the raw skin layer.

After the skin layer has been formed, the mold is cooled for several minutes in a water bath or the like. Then, the mold is opened and the skin is carefully removed, pulling it through an opening provided in the mold, ensuring that the skin is not damaged by the edges of the opening.

Molded articles produced from the resin compositions of the present invention have a desirably thin skin with a thickness of from about 1 to about 4 millimeters, although thicker skin layers may be produced, if desired. The skin layer provided by the polymer compositions of the present invention resemble latex-containing plastics in their resilience and deformability. For example, the skin layer of a product comprising a polymer of the present invention can be folded or pinched as if to form a crease and, when released, the skin will return substantially to its original molded shape. The thermoset compositions of the invention are also relatively elastic, like latex-containing resins. Moreover, the compositions of the present invention, when molded, have a surprisingly smooth, fine texture. For example, with respect to toy figures such as dolls or toy animals, the compositions of the present invention are capable of providing a skin layer with smooth skin, optionally having fine details such as precisely configured wrinkles or the like provided within the surface of the skin layer (i.e., defined by contours of the inner surface of the mold) which wrinkles or the like may be 0.5 mm or less in width and depth. A particularly preferred use for the resin compositions is in the formation of torsos and limbs of inanimate figures such as toy animals or dolls.

The compositions of the present invention may be used in a process for making molded articles. The molding process includes introducing a predetermined quantity of a polymer composition of the present invention into the cavity of a mold. The quantity of the polymer composition should be sufficient to substantially cover the interior walls of the mold. The polymer composition is caused to be maintained substantially completely in contact with all of the interior wall surface, and the mold is heated to a predetermined temperature and for a predetermined amount of time sufficient to form a molded product having a substantially continuous skin layer defined by the interior walls of the mold. Then, the molded article is removed from the mold.

Molded articles may be made by slush molding or rotational cast molding processes using the compositions of the present invention. As is known in the art, in slush molding and rotational cast molding processes, a predetermined amount of skin-forming polymer is introduced into the cavity of the mold. In rotational casting, the mold is partially filled and is rotated around a first axis, while it is simultaneously being moved orbitally around a second axis which is generally at a right angle to the first to ensure uniform coverage of the polymer on the inner surface of the mold. The mold is heated to cause the skin layer to form on its inner surface. Slush molding is carried out by filling the mold entirely with the skin-forming polymer resin and heating the mold to cause that portion of the polymer composition which is in contact with the inner surface of the mold to form a skin layer thereon. After a predetermined period of time, the remaining liquid resin is decanted, leaving a skin layer of substantially continuous and uniform thickness on the interior of the mold. In slush molding, a second heating step may then be carried out to further "set" the skin layer.

By way of example, the method of the invention may be practiced by combining 55 parts by weight diisononylphthalate and 40 parts by weight polyvinylchloride with constant stirring until thoroughly mixed, and then mixing in 2 parts by weight epoxidized soybean oil, 2 parts by weight Brainstab CZ101 (a liquid calcium and zinc organic complex) and 1 part by weight pigment. The resin composition is blended for approximately three hours, followed by degassing in a vacuum chamber for 10–30 minutes to remove air bubbles from the blending process.

In constructing a torso of a toy animal having a length of about 10 inches and a circumference of about 20 inches, for example, a blended and degassed resin composition of the invention is injected by a pumping device connected as is known in the art to a selected slush mold, the interior of which defines the torso of the toy animal. The slush mold is fully filled, closed, and dipped into a 200° C. liquid bath, such as a wax pool for 1 to 2 minutes for a first heating step. In this first heating step, a "raw" skin layer is formed on the inside walls of the mold. The mold is then removed from the heated bath and the excess resin composition from the first heating step is poured off, leaving intact the "raw" skin formed on the inside walls of the slush mold. The mold is then closed again and the raw skin, which is still adherent to the walls of the mold, is "matured" by re-dipping the slush-mold in the heated bath for a second heating step at 200° C. for an additional 1½–2½ minutes. After this second heating step, the mold is removed from the heated bath and transferred to a running cold water bath for several minutes (typically about 5 minutes) to cause the matured skin to separate from the inner surface of the slush mold. The matured skin is then removed through the opening of the slush mold, carefully avoiding damage to the skin.

It will be understood that dimensions, quantities of materials, and processing times and temperatures are only illustrative since conventional rotational molding or slush molding concepts can be utilized in combination with the presently preferred resin compositions of the invention for forming articles of various sizes and shapes, with the quantities of materials and processing conditions being readily determined by those skilled in the art for the particular article being formed.

The invention is further described with reference to the following non-limiting examples.

EXAMPLE 1

The following examples illustrate various ingredients and concentrations which can be used in the preparation of the polymer resin compositions of the invention.

| Ingredients | Parts By Weight |
|---|---|
| 1(a) | |
| Polyvinylchloride | 40 |
| Diisononylphthalate (DINP) | 55 |
| Epoxidized Soybean Oil | 2 |
| Brainstab CZ101 (Ca/Zn) | 2 |
| Pigment | 1 |
| 1(b) | |
| Polyvinylchloride | 40 |
| Di(2-ethyl) hexylphthalate (DEHP) | 55 |
| Epoxidized Soybean Oil | 2 |
| Brainstab CZ101 (Ca/Zn) | 2 |
| Pigment | 1 |
| 1(c) | |
| Polyvinylchloride | 38 |
| Diisononylphthalate | 57 |
| Epoxidized Soybean Oil | 2 |
| Brainstab CZ101 (Ca/Zn) | 2 |
| Pigment | 1 |
| 1(d) | |
| Polyvinylchloride | 40 |
| Diheptylphthalate | 56 |
| Epoxidized Vegetable Oil | 2 |
| Brainstab CZ101 (Ca/Zn) | 2 |
| 1(e) | |
| Polyvinylchloride | 37 |
| Dihexylphthalate | 57 |
| Epoxidized Soybean Oil | 2.5 |
| Brainstab CZ101 (Ca/Zn) | 2.5 |
| Pigment | 1 |
| 1(f) | |
| Polyvinylchloride | 42 |
| Diisodecylphthalate | 54 |
| Epoxidized Sunflower Oil | 1.5 |
| Brainstab CZ101 (Ca/Zn) | 1.5 |
| Pigment | 1 |
| 1(g) | |
| Polyvinylchloride | 43 |
| Diisononylphthalate | 54 |
| Epoxidized Soybean Oil | 1 |
| Brainstab CZ101 (Ca/Zn) | 1 |
| Pigment | 1 |

The polymer compositions of 1(a)–1(g) are prepared by thoroughly mixing the polyvinylchloride and phthalic acid ester. The remaining ingredients are added and mixed for an additional 2–3 hours. The compositions are degassed under vacuum for approximately 30 minutes.

Each polymer composition of Examples 1(a)–1(g) is used individually to make a molded toy animal torso defined by the interior dimensions of a preselected mold. In each case, the mold is completely filled for a slush molding procedure and the mold is heated to 200° C. for 1½ minutes. Then, the excess liquid polymer is poured out of the mold, leaving a "raw" skin formed on the inside walls of the mold. The mold is then closed again and heated at 200° C. for an additional 2 minutes to "mature" the raw skin. The mold is then cooled in a water bath with running water for 4½ minutes. The water bath treatment causes the molded torso to detach from the walls of the mold. The resulting molded torsos have smooth, finely textured skins which are soft and deformably resilient.

The U.S. patents and other publications cited above are incorporated herein by this reference.

Applicants' foregoing description of the present invention is illustrative. Other modifications and variations will be apparent to those of ordinary skill in the art in light of applicants' specification, and such modifications and variations are within the scope of their invention defined by the following claims.

We claim:

1. A polymer composition comprising:
   (1) about 35 to 45 wt % polyvinylchloride;
   (2) about 50 to 60 wt % of a phthalic acid ester, wherein the ester moieties each comprises a linear, branched or cyclic alkyl group having 4 to 12 carbon atoms or a benzyl group;
   (3) about 1 to 3 wt % of a heat stabilizer composition; and
   (4) about 1 to 3 wt % of a heat resistance agent.

2. A polymer composition according to claim 1 wherein the heat resistance agent is an epoxidized vegetable oil.

3. A polymer composition according to claim 1 wherein the heat stabilizer composition is a liquid calcium and zinc organic complex.

4. A polymer composition according to claim 1 wherein the polyvinyl chloride is present at a level of about 38 to 42 wt % and the phthalic acid ester is present at a level of about 53 to 57 wt %.

5. A polymer composition according to claim 1 in which the polyvinylchloride is present at a level of about 40 wt % and the phthalic acid ester is present at a level of about 55 wt %.

6. A polymer composition according to claim 1 wherein the phthalic acid ester is a dialkylphthalate and the alkyl moieties are selected from the group consisting of 2-ethylhexyl, octyl, nonyl, decyl, isooctyl, isononyl and isodecyl.

7. A polymer composition according to claim 6 wherein the phthalic acid ester is diisononylphthalate.

8. A polymer composition according to claim 6 wherein the phthalic acid ester is di-(2-ethyl)hexylphthalate.

9. A polymer composition according to claim 7 which comprises about 40 wt % polyvinylchloride; about 55 wt % diisononylphthalate; about 2 wt % of a liquid calcium and zinc organic complex; about 2 wt % epoxidized soybean oil; and 1 wt % pigment.

10. A polymer composition according to claim 8 which comprises about 40 wt % polyvinylchloride; about 55 wt % di-(2-ethyl)lhexylphthalate; about 2 wt % of a liquid calcium and zinc organic complex; about 2 wt % epoxidized soybean oil; and 1 wt % pigment.

11. A polymer composition according to claim 4 wherein the heat resistance agent is epoxidized vegetable oil and is present at a level of about 2 wt %; and the heat stabilizer composition is a liquid calcium and zinc organic complex and is present at a level of about 2 wt %.

12. A polymer composition according to claim 5 wherein the heat resistance agent is epoxidized vegetable oil and is present at a level of about 2 wt %; and the heat stabilizer composition is a liquid calcium and zinc organic complex and is present at a level of about 2 wt %.

13. A polymer composition according to claim 11 wherein the phthalic acid ester is a dialkylphthalate and the two alkyl moieties are selected from the group consisting of 2-ethylhexyl, octyl, nonyl, decyl, isooctyl, isononyl and isodecyl.

14. A polymer composition according to claim 13 wherein the alkyl moieties are selected from the group consisting of 2-ethylhexyl and isononyl.

15. A polymer composition according to claim 12 wherein the phthalic acid ester is a dialkylphthalate and the two alkyl moieties are selected from the group consisting of 2-ethylhexyl, octyl, nonyl, decyl, isooctyl, isononyl and isodecyl.

16. A polymer composition according to claim 15 wherein the alkyl moieties are selected from the group consisting of 2-ethylhexyl and isononyl.

17. A polymer composition according to claim 1 further comprising up to about 2 wt % of a pigment.

18. A polymer composition according to claim 17 wherein the pigment is present at a level of about 1 wt %.

* * * * *